Dec. 1, 1970   W. C. HASSELO ET AL   3,543,474
GUSSET FORMING MACHINE
Filed Aug. 26, 1968   9 Sheets-Sheet 1

Inventors
William C. Hasselo
Wendell E. Standley
By Richard W. Carpenter
Attorney

Dec. 1, 1970    W. C. HASSELO ET AL    3,543,474
GUSSET FORMING MACHINE

Filed Aug. 26, 1968    9 Sheets-Sheet 6

United States Patent Office 3,543,474
Patented Dec. 1, 1970

3,543,474
GUSSET FORMING MACHINE
William C. Hasselo, Berwyn, Pa., and Wendell E. Standley, Lake Forest, Ill., assignors to Container Corporation of America, Chicago, Ill., a corporation of Delaware
Filed Aug. 26, 1968, Ser. No. 755,168
Int. Cl. B65b 21/04, 21/24
U.S. Cl. 53—48                                10 Claims

ABSTRACT OF THE DISCLOSURE

A machine for forming, from a blank of foldable paperboard, a carrier carton having at least one gusset, the blank being cut and scored to provide a carton having opposed pairs of top and bottom main walls and side walls hingedly interconnected therebetween. One of the main walls is formed of two sections. The black has a gusset section having first, second and third hingedly interconnected panels, the first panel being hinged to one of the side walls, the third panel being hinged to one of the main walls, and the second panel being hinged to the first and third panels. The machine comprises conveying means for advancing the blank along a predetermined path, loading means operating in timed relationship with the conveying means for placing a selected number of articles, such as cans or bottles, on the blank; folding means located along the path for gradually folding the walls relative to one another thereby forming a partially erected tubular structure open at the ends, gusset forming means located along the bath and operating in timed relationship with the folding means and the conveying means for forming the gusset whereby the first gusset panel is folded inwardly and substantially against the interior surface of the side wall to which it is hinged; and means for completing the erection of the tubular structure thereby forming a gusseted carton.

BACKGROUND OF THE INVENTION

Field of the invention

This invention relates to a machine for forming, from a blank of paperboard, a wraparound-type carrier carton having at least one corner located gusset, and more particularly, to a machine suitable for forming the corner located gusset between two walls of a carton disposed generally at right angles to one another and to form the gusset automatically and at a high rate of speed.

The prior art

Wraparound sleeve-type carriers are commonly used for holding plurality of cans or bottles as a group. The carrier generally includes opposed pairs of top and bottom main walls and side walls completely enclosing the group of articles and forming a substantially tubular, sleeve-like, structure. The opposite ends of the sleeve-like carrier are generally left open necessitating provision of some means for retention of the articles within the carrier.

Conventionally, in case of articles such as cans, can retaining means have been utilized to hold the cans within the sleeve, the retaining means including such devices as tabs formed from the top or bottom main walls and folded between the main wall and the can in a manner suitable to engage the recessed end of the can or, openings were formed in the side and main walls adjacent their common hinge line so that the end edges of the cans would protrude through the openings and be trapped by the edges thereof. Further, gussets hinged in various ways to the corner edges of the side and main walls and having portions wrapped around the chime of the can had been utilized.

One problem confronting the general carrier and gusset forming equipment is a production demand for increased speed of packaging, upward from twelve hundred cans or bottles per minute. Another consideration is the dependability of the equipment so as to reduce the stoppage time due to equipment failures.

SUMMARY OF THE INVENTION

The present invention overcomes the disadvantages of the prior art and provides economical, dependable, and fast gusset forming equipment suitable for use with a continuously moving carrier blank for forming article retaining gussets therein. Generally, in the machine of the present invention, the paperboard blanks are positioned on the machine in the flat and conveyed therethrough by conveying means. As the blank is being conveyed, a loading device places the necessary number of grouped articles on the blank. In one embodiment of the invention gusset forming means are provided to preform gusset panels prior to folding of the walls of the carrier. After the gussets have been preformed, carrier walls are folded in such a manner that when the carrier is closed, certain of the gusset panels will become trapped between the article contianed in the carrier and one of the walls of the carrier. In the other embodiment of the invention means are provided to fold the main and side walls relative to one another thereby partially erecting a tubular structure open at the ends. Gusset forming means, located along the conveying path, engage the gusset panels and fold the same in such a way that, when the tubular structure is subsequently closed and formed into a carrier, certain gusset panels will become trapped between the article contained in the carrier and one of the walls to prevent movement of the article out of the carrier.

While this invention is susceptible of embodiment in many different forms, there are shown in the drawings and will herein be described in detail, two embodiments of the invention with the understanding that the present disclosure is to be considered as an exemplification of the principles of the invention and is not intended to limit the invention to the embodiments illustrated. The scope of the invention will be pointed out in the appended claims.

Figures 1, 2, 3, 4:
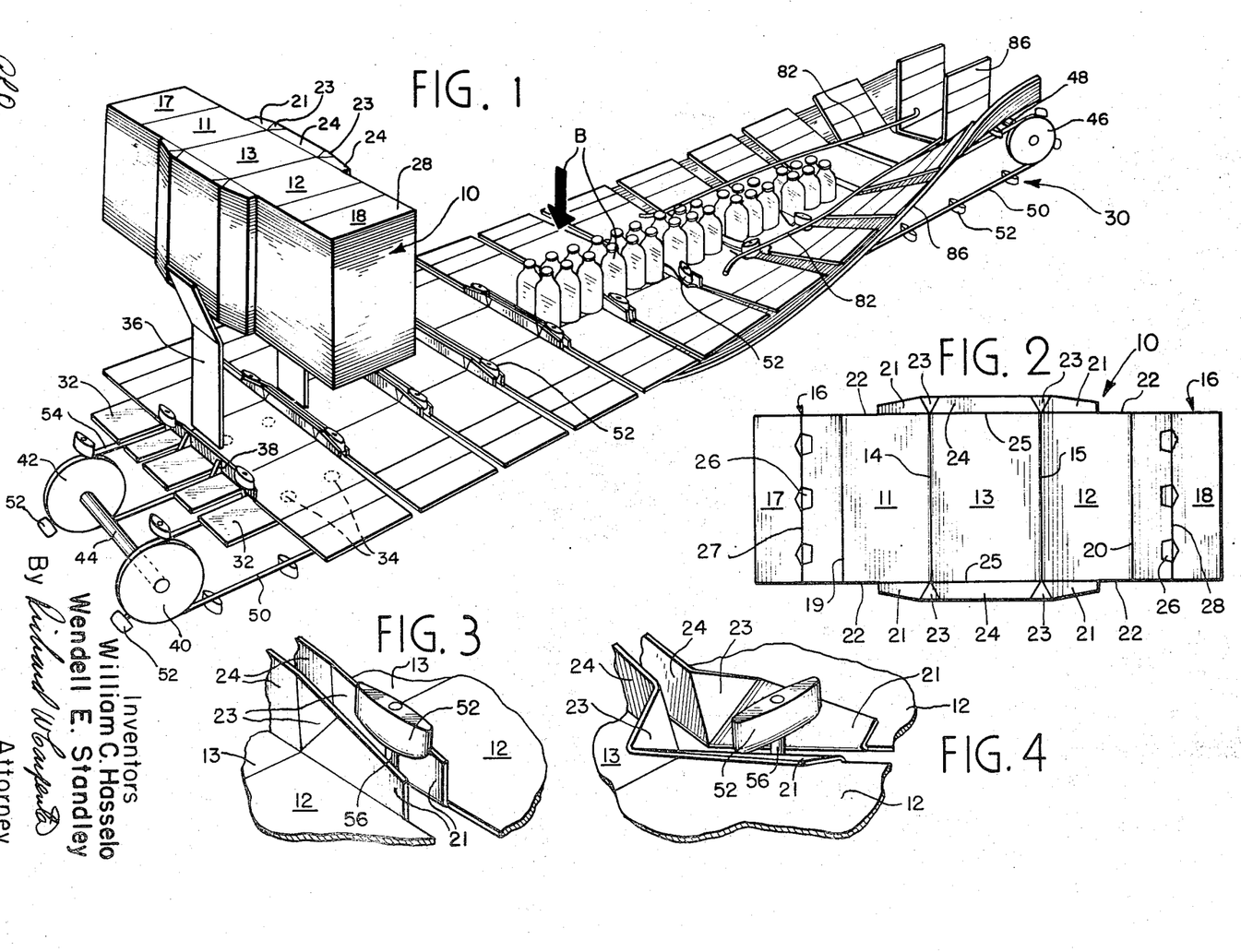
FIG. 1 is a perspective view of the machine representing the first embodiment of the present invention, the bottles having been eliminated from the discharge end of the machine for purposes of clarity.
FIG. 2 is a top view of a paperboard blank which may be used to form a carrier on the machine of FIG. 1.
FIG. 3 is a detailed view of the gusset forming machanism of the machine shown in FIG. 1.
FIG. 4 is another detailed view of the gusset forming mechanism shown in FIG. 3.

Referring now to the drawings, FIGS. 1 through 8 illustrate the machine representing the first embodiment of the present invention. Referring now to FIG. 2, there is shown a paperboard blank, generally designated 10. The blank has a pair of side walls 11 and 12 interconnected by a bottom main wall 13 along hinge lines 14 and 15, respectively. A top main wall, generally designated 16, is formed of two sections 17 and 18 which are hinged to the respective side walls 11 and 12 by hinge lines 19 and 20, respectively. The gusset section of the blank comprises a plurality of gusset panels, including four first gusset panels, all designated 21. Each of the free edges of the side walls 11 and 12 have one of the first gusset panels 21 hingedly attached thereto along one of the hinge lines 22. Four section gusset panels, all designated 23, and having a triangular configuration, are provided in the gusset section of the blank 10. A pair of third gusset panels 24 are hinged to the opposite free edges of the bottom wall 13 along one of the hinge lines 25. Each of the second gusset panels 23 hingedly interconnects the first gusset panel 21 with the third gusset panel 24.

The sections 17 and 18 of the top walls 16 are formed with a plurality of openings 26 for receiving the necks of bottles, or the like, when such articles are enclosed in the carrier formed from blank 10. Extending substantially centrally of the top main wall sections 17 and 18 there are respective fold lines 27 and 28. The function of these fold lines will be described later in connection with the description of a completed carrier.

Referring now to FIG. 1, there is shown a machine generally designated 30. The input end of the machine has a blank receiving surface in the form of stationary bed plates 32. A plurality of suitable blanks 10 is located at the input end of the machine above the stationary bed plates 32. It is to be understood that blanks are to be stored in a hopper situated above the machine. For the purpose of clarity, illustration of the outline of the hopper was eliminated from the drawings relating to this machine. Normally, however, the hopper would be situated in a position presently shown as being occupied by the plurality of blanks 10. The machine has side guide bars 33, shown in FIG. 5A, to prevent sliding of the blanks. A plurality of vacuum cups 34, or the like, are located underneath the blank storage hopper for traveling in a vertical direction to engage the bottom blank in the storage hopper and pull the same downwardly onto the stationary bed plates 32. Once the blank has been deposited on the stationary plates, the vacuum is cut off causing the cups to disengage the blank. The same sequence of operation is repeated for each succeeding blank. A stationary plow element 36, located along the downward path of the blank being pulled from the hopper, folds the gusset sections of the blank 10 upwardly and into a substantially normal relationship with the remainder of the blank. Located between the stationary bed plates 32 there is a plurality of pusher lugs 38 for advancing the blank along the machine for subsequent operations. The pusher lugs 38 are connected to endless chains 39, or the like (as best seen in FIG. 7) which extend the length of the machine paralleling the direction of travel of the blank.

Referring again to the input end of the machine, there is seen a pair of sprockets 40 and 42 interconnected by a shaft 44. A pair of similar sprockets is located at the discharge end of the machine with only sprocket 46 shown in FIG. 1. A sprocket 47 is shown in FIG. 7. The sprockets 46 and 47 are similarly interconnected by a shaft 48 which is connected to a power source (not shown).

A chain 50 extends between the sprocket 40 and the sprocket 46 and has a plurality of rotary pin members 52 secured thereto. A similar chain 54 extends between the sprocket 42 and the sprocket 47 located at the discharge end of the machine, this chain also has identical rotary pin members 52 secured thereto.

Figure 7:
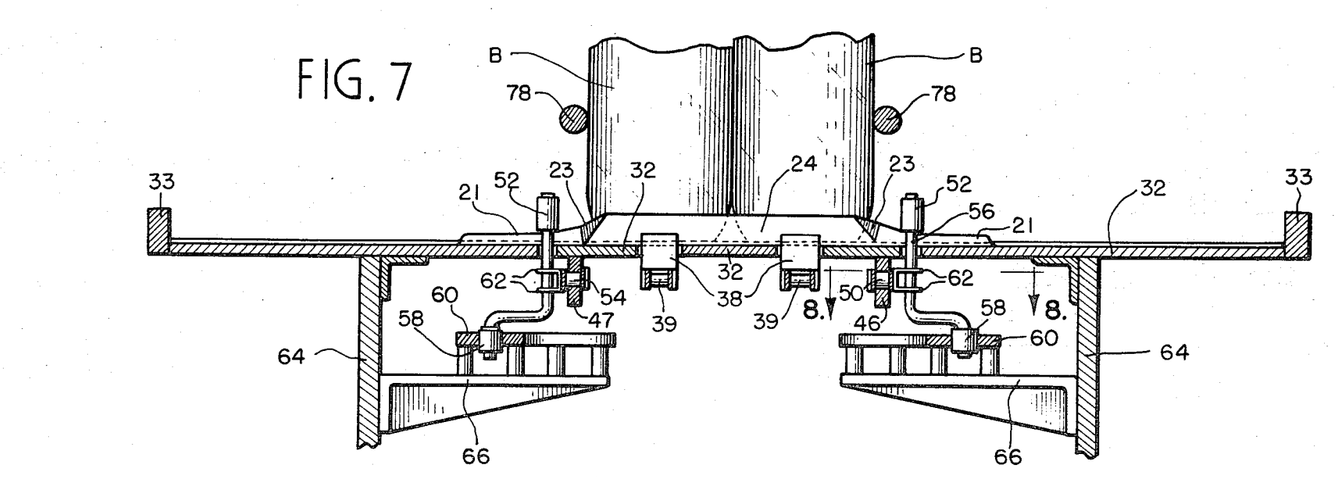
FIG. 7. is a sectional view taken generally along the line 7—7 of FIG. 5B.
Figure 8:
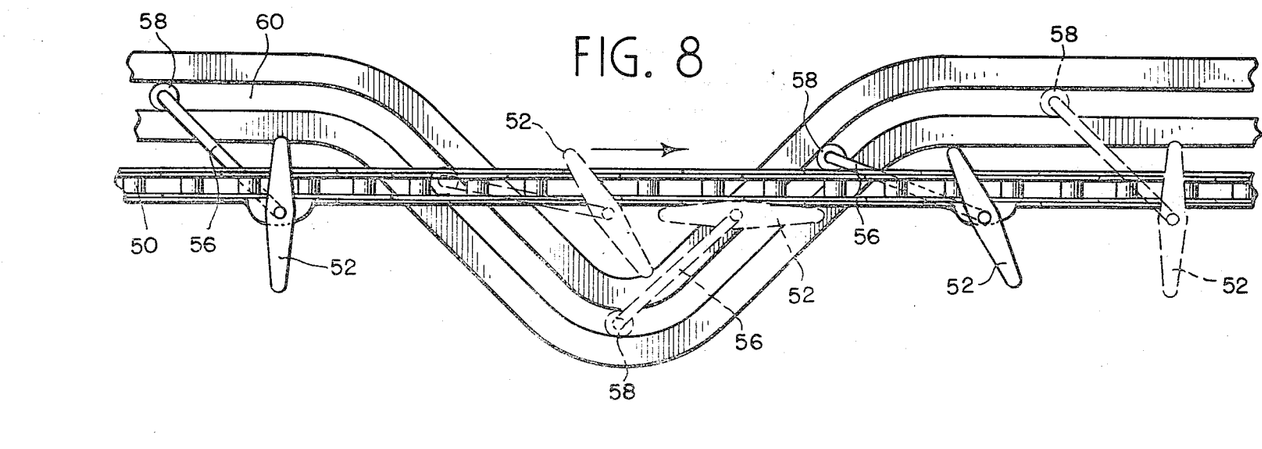
FIG. 8 is a sectional view taken generally along the line 8—8 of FIG. 7.

As best seen in FIGS. 7 and 8, each of the rotary pin members 52 is mounted on a shift 56 which has a cam follower 58 at its lower end. The shaft 56 of the rotary pin member 52 is secured to the chain 50 or 54 by links 62 which provide rotation of the pin member shaft 56 which, in turn, enables rotation of the pin member 52.

The cam followers 58, travelling within the cam track 60, as best seen in FIGS. 7 and 8, determines the relative position of the rotary pin member 52. The cam track 60 is situated below the stationary bed plates 32 and is attached to the frame 64 of the machine by conventional mounting brackets 66.

Figure 5A:
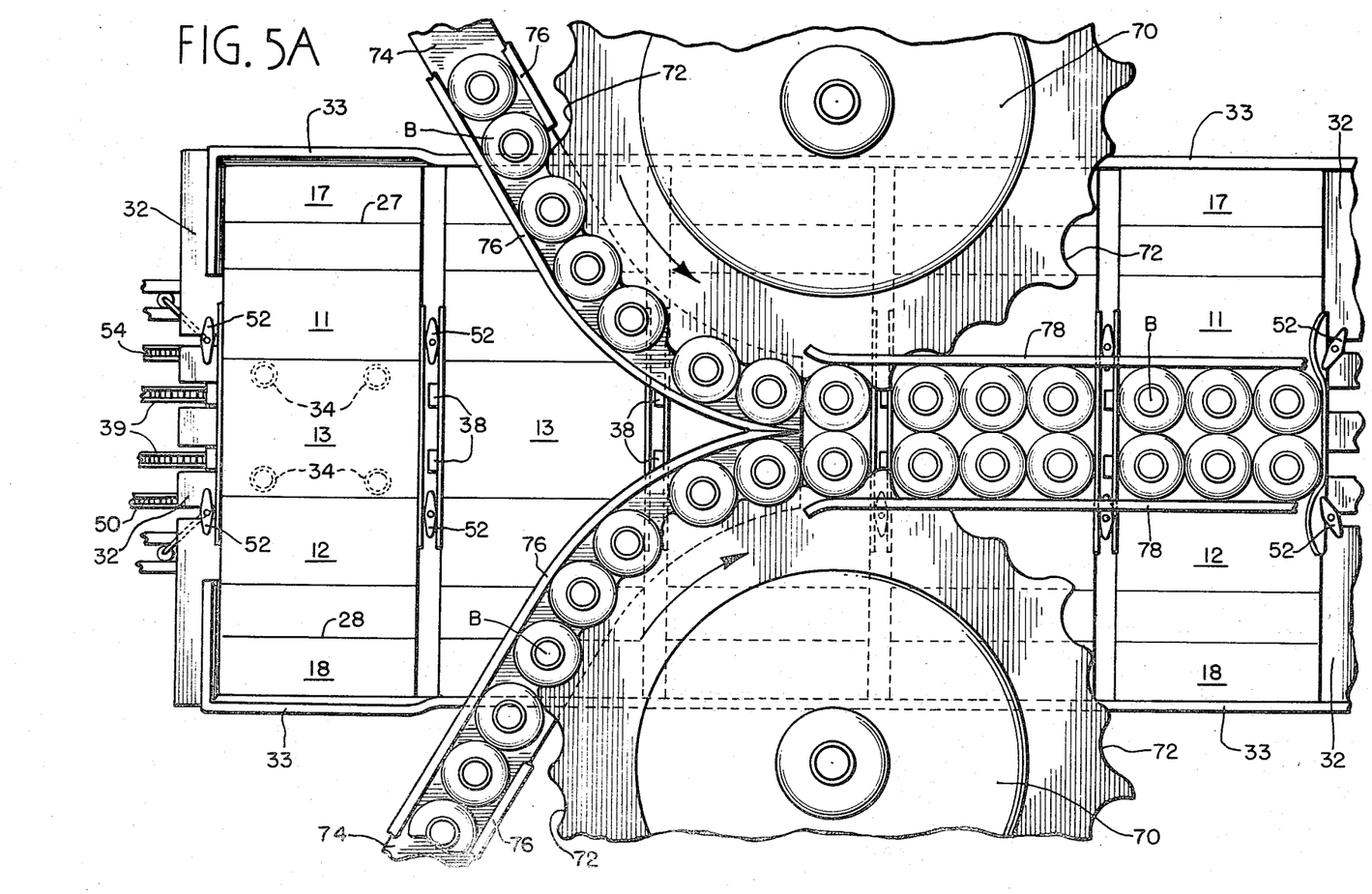
FIG. 5A is a top plan view of the input half of the machine shown in FIG. 1.

Referring now to FIG. 5A there is shown means for loading selected groups of bottles B, or the like, onto the blanks 10 and, more specifically, onto the bottom main wall 13 of the blank 10. The loading means comprises a pair of rotary star wheels 70 formed with a plurality of bottle receiving pockets 72 which receive and guide the bottles from a conveyor 74 and transfer them downwardly onto the blank 10. A pair of guide rails 76 are associated with each star wheel 70 and bottle conveyor 74 to prevent the bottles from falling off the conveyor.

When the bottles arrive in a position ready for placement on the blank 10, they are guided by a pair of parallel guide rails 78 situated above the carton blank 10.

Figures 5B, 6:
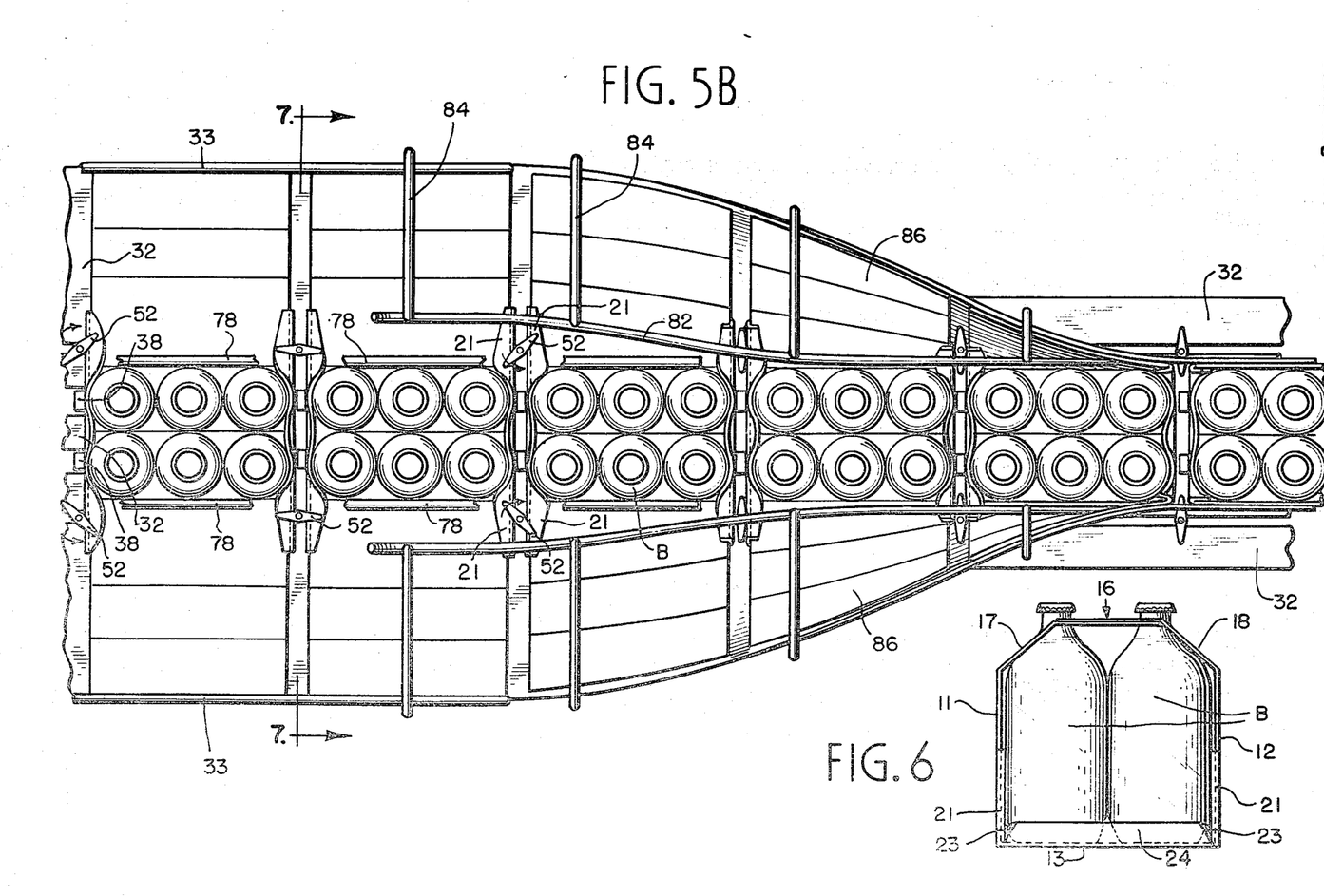
FIG. 5B is a top plan view of the output half of the machine shown in FIG. 1.
FIG. 6 is an end elevational view of a gusseted carrier formed on the machine shown in FIG. 1.

Once the rotary pin member 52 begins to engage and fold the first and second gusset panels, as best seen in FIG. 4, a pair of stationary plows 82, shown in FIGS. 1 and 5B, secured to the side of machine by attaching bars 84, engage the folded gusset panels 21 and 23 and retain the same in the downward position while the blank 10 is being moved along the path toward the discharge end of the machine. Curved folding plows 86 engage the side walls 11 and 12 of the blank 10 and fold the same upwardly as the blank is being moved by the chains 39 toward the discharge end. Following this operation the sections 17 and 18 of the top wall 16 of the blank are joined and the necks of the bottles B are extended through the openings 26 in sections 17 and 18 to complete the container. A completed container is illustrated in FIG. 6.

In the operation of the machine of this embodiment, the gussets are formed in two steps. The first step involves feeding the blanks 10 from a hopper and positioning the blank at the input end of the machine on stationary bed plates 32. As the blank 10 is pulled downwardly by the action of vacuum cups 34, the stationary plow 36 folds the gusset section of the blank 90° to the remainder of the blank. The second step involves folding of first gusset panels 21 against the side walls 12 by rotation of the pin members 52. As the panels 21 are folded, because of their hinged connection to second gusset panels 23, panels 23 are folded partially. The pin members 52 turn approximately 90° thereby sufficiently folding gusset panels 21 so that a product, such as a bottle, will trap gusset panels 21 and 23 as the side walls of the carton are folded upwardly by the folding plows 86. The pin members 52 have a configuration of flat paddles so shaped as to properly engage the gusset panels and are positioned sufficiently high to retain the gusset panels in position prior to engagement thereof by the stationary plows 82. It is to be noted that the same pin member 52 simultaneously folds the trailing gusset panel 21 on one blank and the leading panel 21 on the following blank.

Figure 9:
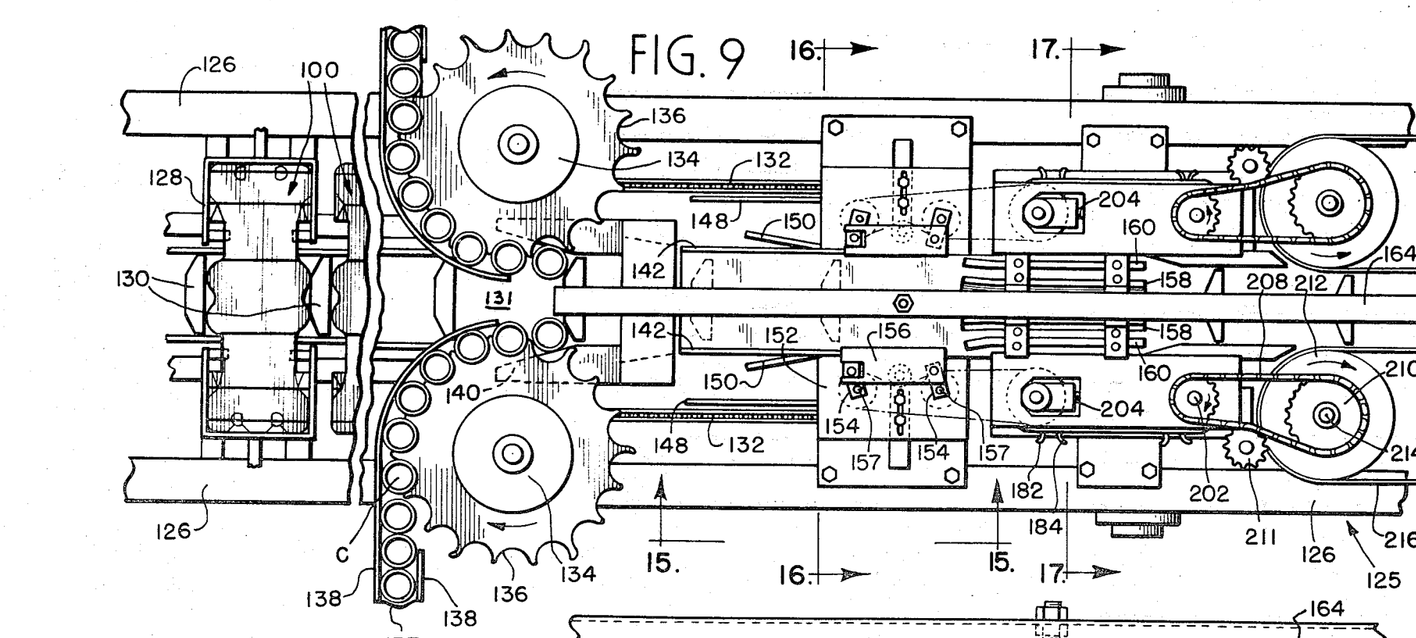
FIG. 9 is a top plan view of the machine representing the second embodiment of the present invention.
Figure 10:
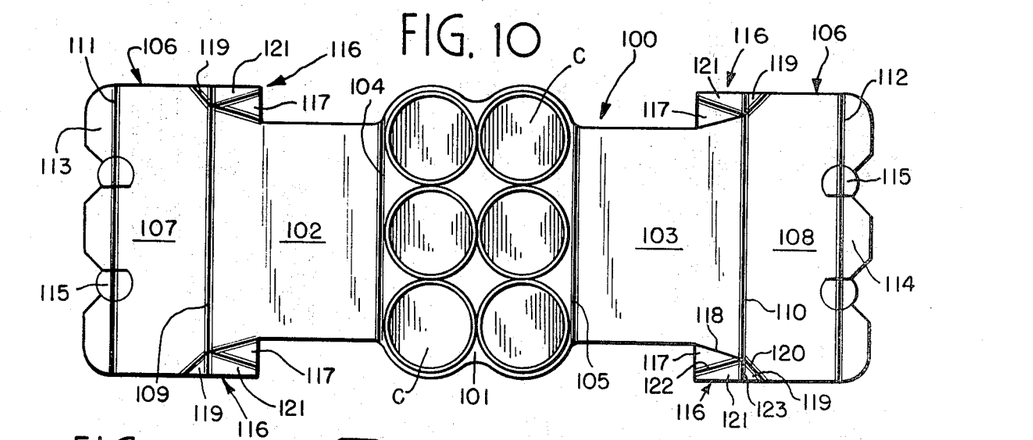
FIG. 10 is a top view of a paperboard blank which may be used to form a carrier on the machine shown in FIG. 9.
Figures 11, 12:
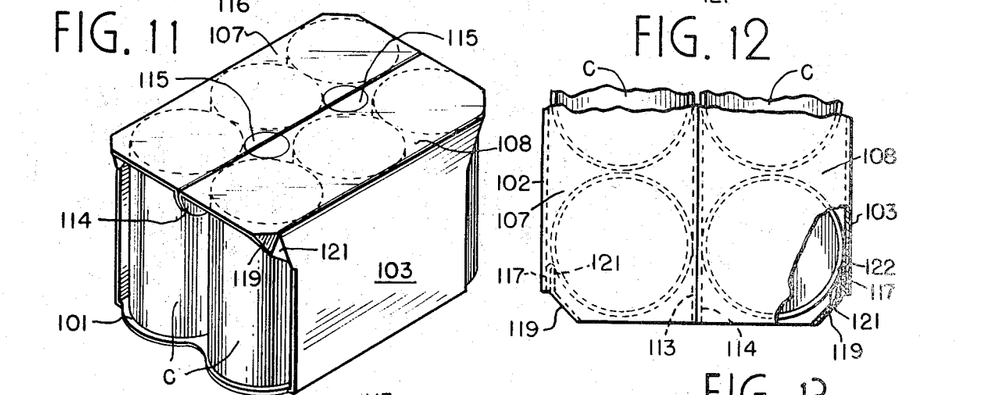
FIG. 11 is a perspective view of a gusseted carrier formed on the machine shown in FIG. 9.
FIG. 12 is a top plan view, partly broken-away, of a portion of the carrier shown in FIG. 11.
Figure 13:
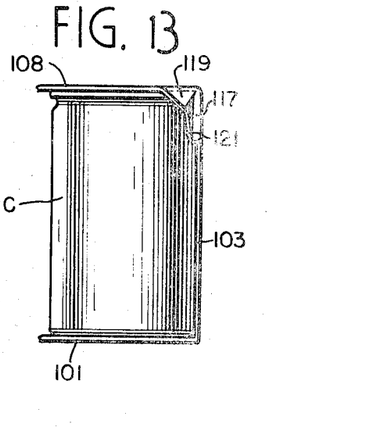
FIG. 13 is an end elevational view of a portion of the carrier shown in FIG. 11.

Referring now to FIGS. 9 throungh 20 for the description of the second embodiment of this invention, FIG. 10 illustrates a paperboard blank, generally designated 100, for forming a wraparound type carrier shown in its completed form in FIG. 11. A plurality of cans C, or the like, are positioned on the bottom main wall 101 of the blank 100 in FIG. 10. A pair of side walls 102 and 103 are hingedly connected to the bottom wall 101 along respective hinge lines 104 and 105. The top main wall 106 is formed of two sections 107 and 108. Section 107 is hinged along line 109 to the side wall 102 while section 108 is hinged along line 110 to the side wall 103. The section 107 has a hinge line 111 with tabs 113 hinged thereto. The section 108 has a hinge line 112 with tabs 114, similar to tabs 113, hinged thereto. As best seen in FIG. 11, the tabs 113 and 114 are secured to one another to bring the sections 107 and 108 of the top wall 106 of the carrier together and close the carrier. The sections 107 and 108 are formed with a pair of finger holes 115 which when the carrier is completed as shown in FIG. 11, are aligned so as to provide convenient carrying means.

The blank 100 has four gusset sections, generally designated 116. Each of the gusset sections comprises a first gusset panel 117 hinged to a respective side wall along a hinge line 118, a third gusset panel 119 hinged to a section of the top main wall along a hinge line 120, and a second gusset panel 121 which hingedly interconnects the first gusset panel 117 and the third gusset panel 119 along respective fold lines 122 and 123.

Referring now to FIG. 9, there is shown a machine, generally designated 125. The machine 125 is supported on a frame 126 and has a blank receiving surface 128 located at the input end thereof, that is, on the left-hand side as viewed in FIG. 9. The blanks 100 are advanced through the machine by pusher elements 130 each of said pusher elements engaging one blank and being located to define blank pockets 131 therebetween.

A chain type conveyor 132 is shown to extend generally horizontally through the length of the machine 125. Since the machine is symmetrical, a detailed description of half of the machine will be given herein with the understanding that the elements described in this half of the machine are also found in the other half thereof.

Figure 16:
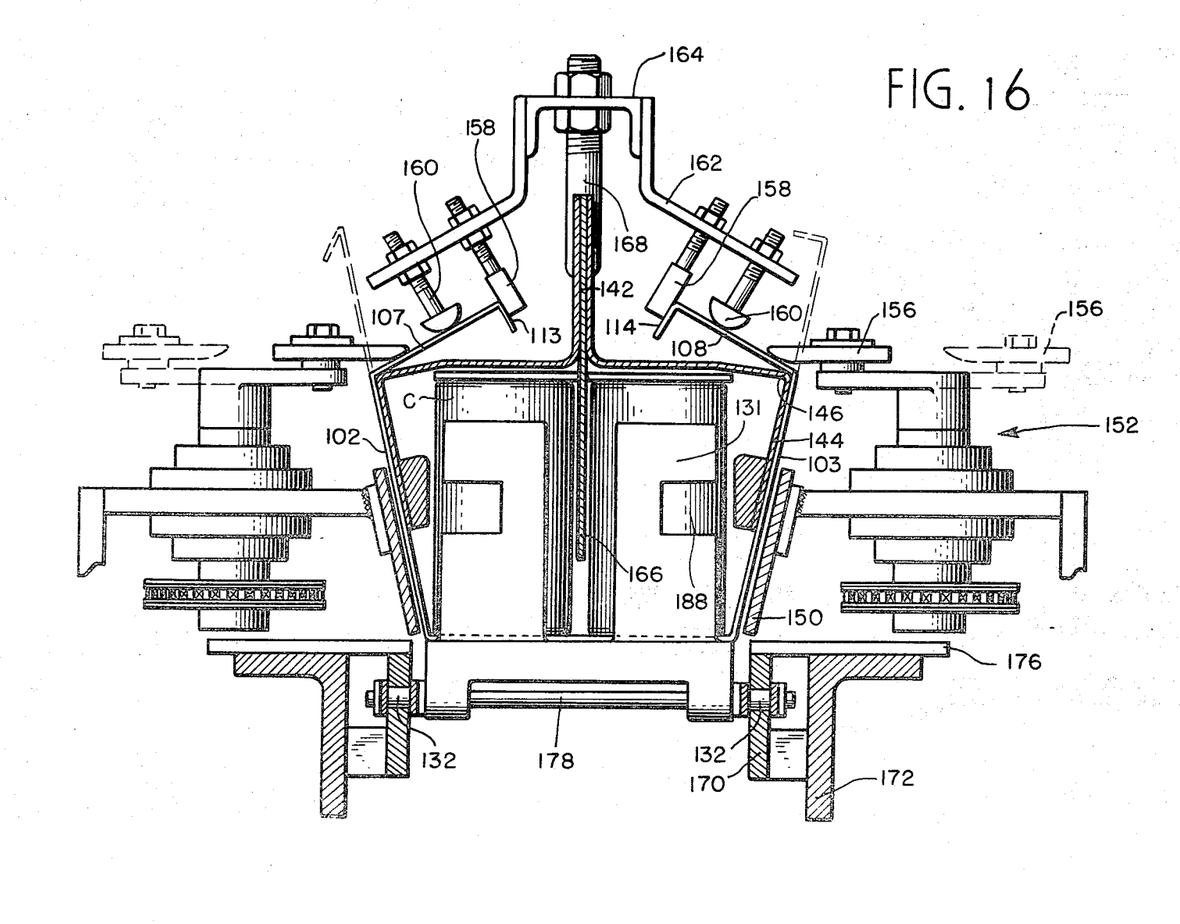
FIG. 16 is a sectional view taken generally along the line 16—16 of FIG. 9.

A rotary star wheel 134 having a plurality of can receiving pockets 136 receives cans C from another source such as can conveyor 137, between guide bars 138 and feeds the same, desirably grouped, onto the blank 100 when the blank passes the star wheel 134. Guide plow 140 guides the cans from the pockets 136 of the rotary star wheel 134 onto the blank 100. A can and blank guide 142, as best seen in FIG. 16, is supported above the can group and has side elements 144 which extend from the upper corners 146 downwardly toward the bottom edge of the can group. As the blank 100, with a group of cans C positioned thereon, is being moved to the right in the machine, folding plows 148 and 150 fold the side wall 103 of the carrier upwardly and against the side element 144 of the can and blank guide 142. In this position, the top main wall section 108 of the carrier blank 100 and the side wall 103 of the blank are coplanar. A walking beam mechanism 152 is used to fold the section 108 on the hinge line 110, the mechanism consisting basically of a plurality of spaced links 154 and a bar element 156 connected thereto. Each of the links 154 rotates about a fixed pivot point 157 to move the bar element 156 in an oscillating manner. The bar element 156 engages the section 108 of the top wall and simultaneously moves horizontally in line with the blank 100, so as to fold the section 108. After the section 108 is folded over, a pair of guide rails 158 and 160 are used to retain the section in a folded position thereby permitting withdrawal of the bar element 156. The guide rails 158 and 160 are mounted by conventional means on rail support 162 which, in turn, is connected to a channel rack 164 positioned above the path of travel of the blank. It can be observed in FIG. 16 that the tabs 114 hingedly connected to the section 108 of the top wall, are being held in position by the guide rail 158, the tabs having been prefolded into their present position by the existing folding equipment (not shown) located upstream of the star wheel 134.

Still referring to FIG. 16, a splitter plate 166 is attached to a mounting arm 168 which, in turn, is joined to the channel rack 164. The splitter plate 166 is positioned between two rows of cans so as to separate them while the carrier is being formed about the cans.

Referring now to the lower portion of FIG. 16, there is shown a pair of sprockets 170 about which the chain conveyors 132 are moved. A mounting bracket 172 is connected to a horizontal bed plate 176 of the machine. A shaft 178 connects blank pushers 130 to the chain conveyor 132. The blank pusher 130 is shown as having a cut-out portion 180.

Figure 14:
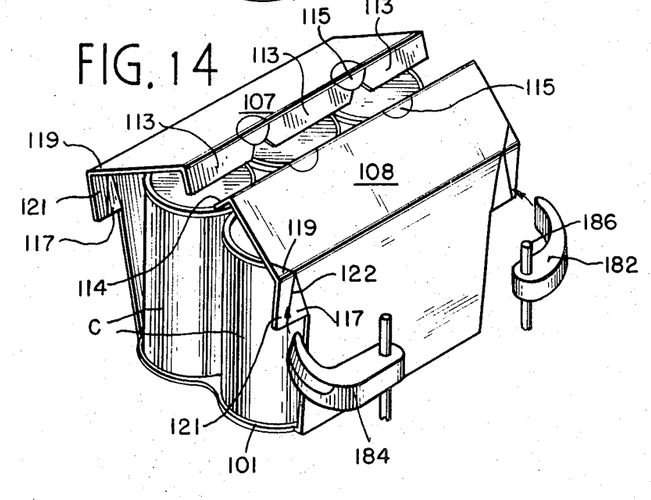
FIG. 14 is a view illustrating formation of gussets in the carrier of FIG. 11.
Figure 15:
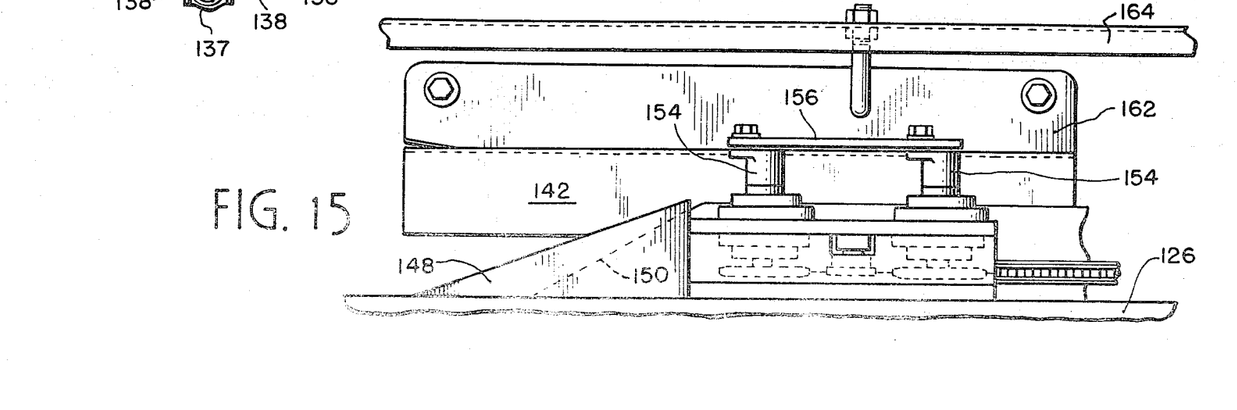
FIG. 15 is a sectional view taken generally along the line 15—15 of FIG. 9.

When the blank 100 is in the position indicated in FIG. 14 the forming of gussets is begun. The gusset forming mechanism is shown in FIGS. 17 through 20. Before a group of cans positioned on a blank 100 enters the gusset folding mechanism, the can and blank guide 142 terminates so that the side wall of the blank is unsupported other than by the folding plow 150 on the outside of the blank and the plow 140 on the inside thereof.

Figure 17:
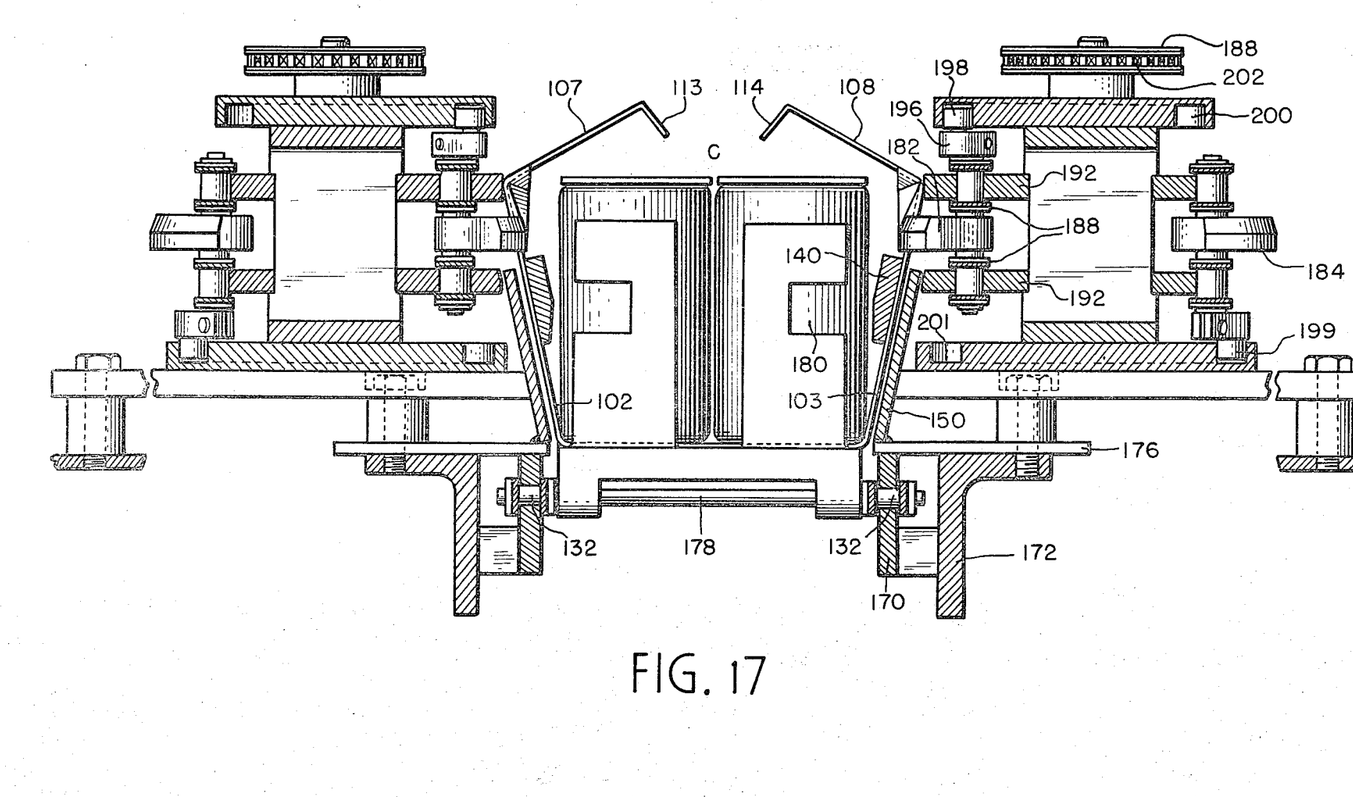
FIG. 17 is a sectional view taken generally along the line 17—17 of FIG. 9.
Figure 18:
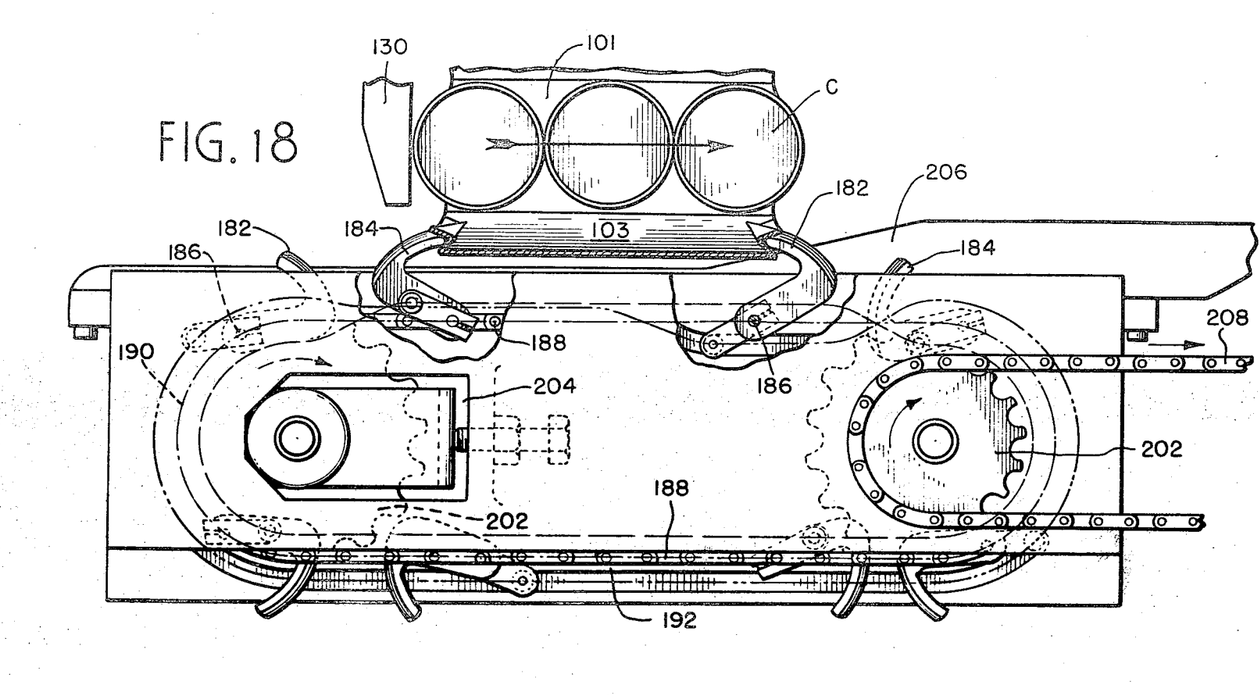
FIG. 18 is a view illustrating the gusset forming mechanism of machine shown in FIG. 9.
Figure 19:
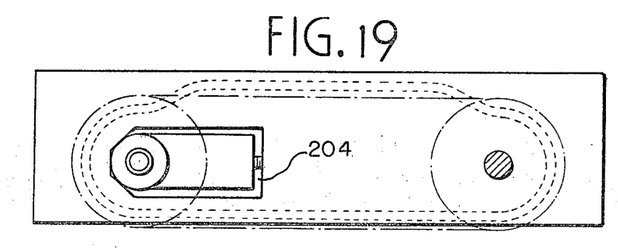
FIG. 19 is a view illustrating one cam track of the gusset forming mechanism of FIG. 18.
Figure 20:
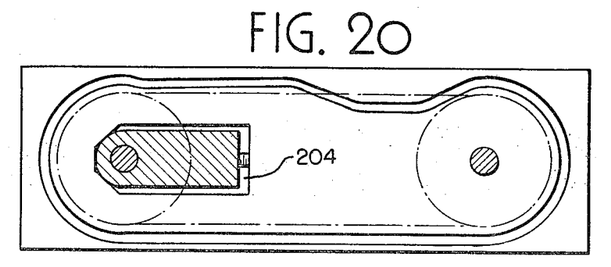
FIG. 20 is a view illustrating another cam track of the gusset forming mechanism shown in FIG. 18.

The gusset forming mechanism has a leading tuck finger 182 and a trailing tuck finger 184 for each blank 100. As best seen in FIG. 18, the leading and trailing tuck fingers are identical in design and therefore a detailed description of finger 182 will be given herein with the understanding that other fingers are identical to the finger described. Referring to FIGS. 17 and 18, the tuck finger 182 is pivoted on a pin or shaft 186 which is carried by a chain conveyor 188 for traveling along a center line 190. The chain conveyor 188 is supported by guides 192, the tuck finger 182 being keyed to the shaft 186 while a link 196 is similarily keyed to the shaft 786 and has a cam follower 198 secured thereto. Each of the cam followers 198 or 199 is being guided within a cam track 200 or 201 so that the links 196 and, in turn the tuck fingers 182 and 184 oscillate as they travel around the end sprockets 202 between which the chain conveyor 188 extends. Take-up devices 204 are provided for controlling tension of the chain conveyors. As best seen in FIG. 9, sprockets 202 are driven by a chain 208; interconnecting the sprockets 202 with sprocket 210. An idler sprocket 211 controls tension of the chain 208. The sprocket 210 is operatively connected to a disc 212 by common shaft 214. A compression chain 216 drives the disc 212 from power source (not shown).

It is to be observed, from FIG. 17, that there are two separate cam tracks 200 and 201 used for the respective control of the leading and trailing tuck fingers 182 and 184. In the drawing, the upper cam track 200 is used for the control of the trailing tuck finger 184 while the lower cam track 201 controls the leading tuck finger 182. Therefore, the cam followers 198 and 199 are moved along the center lines to provide rotary motion to the tuck fingers 182 and 184, respectively.

The tuck fingers are moved toward the center of the carrier blank simultaneously so that the gussets at the opposite edges of the blank 100 are folded at the same time. Each tuck finger is designed to contact the first gusset panel 117, the contact point being made along the hinge line 122. Upon contact, the inward movement of the tuck finger 182 or 184 moves the first gusset panel 117 and the second gusset panel 121 inwardly and substantially against the interior surface of the side wall 103 of the carrier blank 100. Following the above positioning of the first and second gusset panels, the third panel 119 is pushed downwardly by engagement of overhead plow element 206 with wall sections 107 and 108. The gusset panel 119 is thereby placed into an almost snug contacting relationship with can C positioned on the bottom wall 101 of the carrier blank 100. At almost the exact time that the plow element 206 engages the sections 107 and 108 the previously mentioned guide rails 158 and 160 element 206 with wall sections 107 and 108. The gusset panel can be deflected by the plow 206. The tuck fingers 182 and 184 are withdrawn from engagement with the gusset panels before the carrier is finally formed. Thus, a gusseted blank having a group of cans positioned thereon, continues to be advanced in the machine at which time the top main wall sections 107 and 108 are secured to one another by interengagement of tabs 113 and 114, or the like. The carrier is thus completed and may be removed from the machine by suitable means.

While the carrier formed by this machine and described herein was provided with gussets at the top wall-side wall corner, the same principle can be utilized for formation of gussets at the bottom wall-side wall corner as well. The top wall sections 107 and 108 may be joined by a lap joint, or the like, rather than by the interengagement of tabs 113 and 114.

We claim:

1. A machine for forming, from a blank of foldable paperboard, a carrier carton having at least one gusset, said blank being cut and scored to provide a carton having opposed pairs of top and bottom main walls and side walls hingedly interconnected therebetween; one of said main walls being formed of two sections; and a gusset section having first, second and third hingedly interconnected panels, the first panel being hinged to one of said side walls, the third panel being hinged to one of said main walls, and the second panel being hinged to the first and third panels, the combination comprising:
   (a) conveying means for advancing the blank along a predetermined path;
   (b) loading means operating in timed relationship with the conveying means for placing a selected number of articles on the blank;
   (c) gusset forming means located along said path and operative in timed relationship with said conveying means and comprising at least one rotary pin member moveable along said path and being adapted to rotatably engage and fold said first gusset panel substantially against the side walls to which said panel is hinged;
   (d) means for folding said walls into substantially normal relationship to one another to enclose said articles therebetween thereby trapping the first and second gusset panels between one of said articles and the side wall to which said first panel is hinged and for positioning the third gusset panel generally against said article to complete formation of a gusset.

2. A machine for forming, from a blank of foldable paperboard, a carrier carton having at least one gusset, said blank being cut and scored to provide a carton having opposed pairs of top and bottom main walls and side walls hingedly interconnected therebetween; one of said main walls being formed of two sections; and a gusset section having first, second and third hingedly interconnected panels, the first panel being hinged to one of said side walls, the third panel being hinged to one of said main walls, and the second panel being hinged to the first and third panels, the combination comprising:
   (a) conveying means for advancing the blank along a predetermined path;
   (b) loading means operating in timed relationship with the conveying means for placing a selected number of articles on the blank;
   (c) gusset forming means located along said path and operative in timed relationship with said conveying means and comprising at least one oscillating tuck finger moveable along a path paralleling and adjacent to said predetermined path along which said blank is advanced, said tuck finger being adapted to engage the hinge line between the first and second gusset panels for folding said first panel substantially against a side wall;
   (d) means for folding said walls into substantially normal relationship to one another to enclose said articles therebetween thereby trapping the first and second gusset panels between one of said articles and the side wall to which said first panel is hinged and for positioning the third gusset panel generally against said article to complete formation of a gusset.

3. A machine for forming, from a blank or foldable paperboard, a carrier carton having at least one gusset, said blank being cut and scored to provide a carton having opposed pairs of top and bottom main walls and side walls hingedly interconnected therebetween; one of said main walls being formed of two sections; and a gusset section having first, second and third hingedly interconnected panels, the first panel being hinged to one of said side walls, the third panel being hinged to one of said main walls, and the second panel being hinged to the first and third panels, the combination comprising:
   (a) conveying means for advancing the blank along a predetermined path;
   (b) loading means operating in timed relationship with the conveying means for placing a selected number of articles on the blank;
   (c) first folding means located along said path for gradually folding said walls relative to one another and about said articles;
   (d) gusset forming means located along said path and operative in timed relationship with said folding means and said conveying means and comprising at least one oscillating tuck finger moveable along a path paralleling said predetermined path so that said tuck finger engages a hinge line between the first and second gusset panels for folding said first gusset panel substantially against the side wall to which said first panel is hinged;
   (e) second folding means for folding said walls into substantially normal relationship to one another to enclose said articles therebetween thereby trapping the first and second gusset panels between one of said articles and the side wall to which said first panel is hinged and positioning the third gusset panel generally against said article to complete formation of a gusset.

4. A machine for forming, from a blank of foldable paperboard, a carrier carton having at least one gusset, said blank being cut and scored to provide a carton having opposed pairs of top and bottom main walls and side walls hingedly interconnected therebetween; one of said main walls being formed of two sections; and a gusset section having first, second and third hingedly interconnected panels, the first panel being hinged to one of said side walls, the third panel being hinged to one of said main walls, and the second panel being hinged to the first and third panels, the combination comprising:
   (a) conveying means for advancing the blank along a predetermined path;
   (b) loading means operating in timed relationship with the conveying means for placing a selected number of articles on the blank;
   (c) gusset forming means moveable along said path in timed relationship with said conveying means for simultaneously folding the first gusset panels of two consecutive blanks inwardly to place each of said first panels substantially against the interior surface of the respective side wall to which said first panel is hinged;
   (d) folding means located adjacent said path for folding said walls into substantially normal relationship to one another to enclose said articles therebetween thereby trapping the first and second gusset panels between one of said articles and the side wall to which said first panel is hinged;

(e) means for joining the two sections of said main wall thereby forming a carrier.

5. A machine as defined in claim 4, wherein said gusset forming means comprises at least one rotary pin member adapted to simultaneously engage and fold the first gusset panel on the trailing edge of a blank and a first gusset panel on the leading edge of a succeeding blank.

6. A machine as defined in claim 4, wherein said folding means comprises at least a pair of folding plow elements.

7. A machine for forming, from a blank of foldable paperboard, a carried carton having at least one gusset, said blank being cut and scored to provide a carton having opposed pairs of top and bottom main walls and side walls hingedly interconnected therebetween; one of said main walls being formed of two sections; and a gusset section having first, second and third hingedly interconnected panels, the first panel being hinged to one of said side walls, the third panel being hinged to one of said main walls, and the second panel being hinged to the first and third panels, the combination comprising:

(a) conveying means for advancing the blank along a predetermined path;
(b) loading means operating in timed relationship with the conveying means for placing a selected number of articles on the blank;
(c) a plurality of folding plows located along said path for partially folding said walls relative to one another and about said articles whereby the included angle between the walls is greater than 90°;
(d) at least one oscillating tuck finger operating operating in timed relationship with the conveying means for folding said first panel inwardly and substantially against the interior surface of the side wall to which said first panel is hinged;
(e) a stationary bar element to be engaged by the third gusset panel for moving said third gusset panel toward the interior of the carton and generally against one of the articles contained therin;
(f) a plurality of stationary folding plows located along said path for engaging and folding said partially folded walls substantially normal to one another thereby trapping the first and second gusset panels between said article and said side wall to which said first panel is hinged;
(g) securing means for joining the sections of the main wall to complete a carrier carton.

8. A machine for forming, from a blank of foldable paperboard, a carrier carton having at least one gusset, said blank being cut and scored to provide a carton having opposed pairs of top and bottom main walls and side walls hingedly interconnected therebetween; one of said main walls being formed of two sections; and a gusset section having first, second and third hingedly interconnected panels, the first panel being hinged to one of said side walls, the third panel being hinged to one of said main walls, and the second panel being hinged to the first and third panels, the combination comprising:

(a) a receiving surface for receiving a blank having the gusset section positioned substantially normal to the remainder of the blank;
(b) conveying means for advancing the blank along a predetermined path;
(c) loading means operating in timed relationship with the conveying means for placing a selected number of articles on the blank;
(d) rotary pin members moveable along said path in timed relationship with said conveying means for engaging and folding the first gusset panel substantially against the interior surface of the side wall to which said panel is hinged;
(e) a plurality of plow elements for engaging and folding said walls relative to one another thereby trapping the first and second gusset panels between one of said articles and the side wall to which said first panel is hinged;
(f) means for joining said sections of said main wall to form a carrier carton.

9. A machine for forming, from a blank of foldable paperboard, a carrier carton having at least one gusset, said blank being cut and scored to provide a carton having opposed pairs of top and bottom main walls and side walls hingedly interconnected therebetween; one of said main walls being formed of two sections; and a gusset section having first, second and third hingedly interconnected panels the first panel being hinged to one of said side walls, the third panel being hinged to one of said main walls, and the second panel being hinged to the first and third panels, the combination comprising:

(a) conveying means for advancing the blank along a predetermined path;
(b) loading means operating in timed relationship with the conveying means for placing a selected number of articles on the blank;
(c) at least one rotary pin member moveable along said path in timed relationship with said conveying means for engaging and folding the first gusset panel substantially against the interior surface of the side wall to which said panel is hinged;
(d) a plurality of plow elements for engaing and folding said walls relative to one another thereby trapping the first and second gusset panels between one of said articles and the side wall to which said first panel is hinged.

10. A machine for forming, from a blank of foldable paperboard, a carrier carton having at least one gusset, said blank being cut and scored to provide a carton having opposed pairs of top and bottom main walls and side walls hingedly interconnected therebetween; one of said main walls being formed of two sections; and a gusset section having first, second and third hingedly interconnected panels, the first panel being hinged to one of said side walls, the third panel being hinged to one of said main walls, and the second panel being hinged to the first and third panels, the combination comprising:

(a) conveying means for advancing the blank along a predetermined path;
(b) loading means operating in timed relationship with the conveying means for placing a selected number of articles on the blank;
(c) at least one oscillating tuck finger moveable adjacent said predetermined path and adapted to engage the hinge line between the first and second gusset panels for folding said first panel substantially against the side wall to which said panel is hinged;
(d) folding means for folding said walls into substantially normal relationship to one another to enclose said articles therebetween thereby trapping the first and second gusset panels between one of said articles and the side wall to which said first panel hinged.

References Cited

UNITED STATES PATENTS

| | | | |
|---|---|---|---|
| 2,832,182 | 4/1958 | McGihon | 53—48 X |
| 3,108,414 | 10/1963 | Schleicher et al. | 53—48 |
| 3,295,291 | 1/1967 | Wood | 53—48 X |

THERON E. CONDON, Primary Examiner

E. F. DESMOND, Assistant Examiner

U.S. Cl. X.R.

53—209